US012288458B2

(12) United States Patent
Matheny

(10) Patent No.: US 12,288,458 B2
(45) Date of Patent: Apr. 29, 2025

(54) SYSTEMS AND METHODS FOR EMERGENCY MANAGEMENT

(71) Applicant: WESTNET, LLC, Huntington Beach, CA (US)

(72) Inventor: Richard Matheny, Huntington Beach, CA (US)

(73) Assignee: Westnet LLC, Huntington Beach, CA (US)

( * ) Notice: Subject to any disclaimer, the term of this patent is extended or adjusted under 35 U.S.C. 154(b) by 0 days.

(21) Appl. No.: 18/606,932

(22) Filed: Mar. 15, 2024

(65) Prior Publication Data

US 2024/0221490 A1 Jul. 4, 2024

Related U.S. Application Data

(63) Continuation-in-part of application No. 18/106,847, filed on Feb. 7, 2023, now Pat. No. 12,165,493.

(60) Provisional application No. 63/307,551, filed on Feb. 7, 2022.

(51) Int. Cl.
*G08B 25/01* (2006.01)

(52) U.S. Cl.
CPC .................................. *G08B 25/016* (2013.01)

(58) Field of Classification Search
CPC .................................................... G08B 25/016
USPC ..................................................... 340/539.11
See application file for complete search history.

(56) References Cited

U.S. PATENT DOCUMENTS 6,396,814 B1 * 5/2002 Iwamura ............... H04L 12/185 370/235
6,897,781 B2 5/2005 Cooper et al.
10,341,495 B2 7/2019 Brown et al.
10,382,933 B2 8/2019 Pawar et al.
10,531,266 B2 1/2020 Rauner
10,713,932 B2 7/2020 Singh
10,820,182 B1 10/2020 Newman et al.
10,997,849 B1 5/2021 Potter et al.
11,138,855 B2 10/2021 Jafri et al.
2004/0008253 A1 * 1/2004 Monroe ............. H04B 7/18506 348/E7.086
2005/0242944 A1 11/2005 Bankert et al.
2006/0047543 A1 3/2006 Moses
2007/0008104 A1 1/2007 McBain
2007/0210910 A1 9/2007 Norstrom et al.
2008/0214142 A1 9/2008 Morin et al.
(Continued)

FOREIGN PATENT DOCUMENTS

CA 2453709 A1 6/2005
CA 3088114 A1 7/2019
(Continued)

OTHER PUBLICATIONS

International Search Report and Written Opinion for International Application No. PCT/US2023/012531 dated Jun. 2, 2023; 8 pgs.

*Primary Examiner* — Naomi J Small
(74) *Attorney, Agent, or Firm* — Ryan Dean; Umberg Zipser LLP

(57) ABSTRACT

Apparatus, systems, and methods are described herein for an emergency management and response system for an airport. These systems and methods utilize a network of devices that can be configured to automatically receive an alert from a control tower or dispatch based on selected criteria about an emergency.

18 Claims, 3 Drawing Sheets

(56) References Cited

U.S. PATENT DOCUMENTS

| | | | | |
|---|---|---|---|---|
| 2011/0128144 | A1* | 6/2011 | Baron, Sr. | G08B 21/10 340/539.3 |
| 2014/0100891 | A1 | 4/2014 | Turner et al. | |
| 2014/0143729 | A1 | 5/2014 | Myers et al. | |
| 2015/0359013 | A1 | 12/2015 | Krizik et al. | |
| 2016/0292932 | A1 | 10/2016 | Gremmert et al. | |
| 2019/0066464 | A1* | 2/2019 | Wedig | G08B 27/001 |
| 2021/0021980 | A1* | 1/2021 | Barash | G08B 25/005 |
| 2021/0258757 | A1 | 8/2021 | McGovern | |
| 2021/0276728 | A1 | 9/2021 | Mast et al. | |
| 2021/0407273 | A1 | 12/2021 | Jafri et al. | |
| 2022/0014894 | A1 | 1/2022 | Xu | |
| 2022/0159442 | A1 | 5/2022 | Newman et al. | |

FOREIGN PATENT DOCUMENTS

| | | | |
|---|---|---|---|
| DE | 102020004629 | A1 | 2/2022 |
| WO | 2019143692 | A1 | 7/2019 |
| WO | 2021174291 | A1 | 9/2021 |

* cited by examiner

SYSTEMS AND METHODS FOR EMERGENCY MANAGEMENT

This application is a continuation-in-part application of U.S. non-provisional patent application filed on Feb. 7, 2023, and assigned Ser. No. 18/106,847, which itself claims priority to U.S. provisional patent application filed on Feb. 7, 2022 and assigned Ser. No. 63/307,551. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is emergency management systems and methods, and especially those for use in airport settings.

BACKGROUND

The following description includes information that may be useful in understanding the present invention. It is not an admission that any of the information provided herein is prior art or relevant to the presently claimed invention, or that any publication specifically or implicitly referenced is prior art.

As the nation's infrastructure continues to age, newer technologies are forcing airport managers to scrutinize legacy emergency response systems. While investment in state-of-the-art radar, meteorological equipment and advanced aircraft are all vital to modern day aviation safety, often the emergency response systems at airports continue to rely upon outdated methods and delivery systems. In certain locales, the government or other agencies have set specific response time goals for airport first responders. However, the antiquated systems often in use have become a challenge for airports to meet the response time. The resulting delays in response times can lead to loss of aircraft, property, and human life.

Government standards and requirements mandate superior performance, especially in the realm of life saving public safety and rescue. This is especially true as often every second counts during an emergency situation. A faster response can result in more lives saved. Unfortunately, most crash phone systems used at airports throughout the country are antiquated, often having aging analog copper lines that are unreliable, unmonitored, and failing at alarming rates. Airports are paying expensive, reoccurring rental fees on lines that are often decades old and unserviceable with obsolete parts.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for improved systems and methods that can increase response rates in emergency situations.

SUMMARY OF THE INVENTION

The inventive subject matter provides apparatus, systems and methods for an emergency management and response system for an airport. Contemplated systems and methods described herein advantageously eliminate the difficulties of existing crash phones and other problems described above. These digital systems and methods described herein can transmit alerts to all locations at an airport within less than one second.

In addition, the systems and methods can be used to provide emergency alerts and instructions from a control tower or other location simultaneously to all crash phone locations. The systems and method are configured to provide all of the information necessary for emergency personnel to respond to an emergency in the fastest possible manner. The systems and methods can be utilized with alert tones and visual display devices located throughout a fire station or other location to give emergency personnel the key information needed to respond to the emergency.

Various objects, features, aspects, and advantages of the inventive subject matter will become more apparent from the following detailed description of preferred embodiments, along with the accompanying drawing figures in which like numerals represent like components.

DETAILED DESCRIPTION

Figure 1:
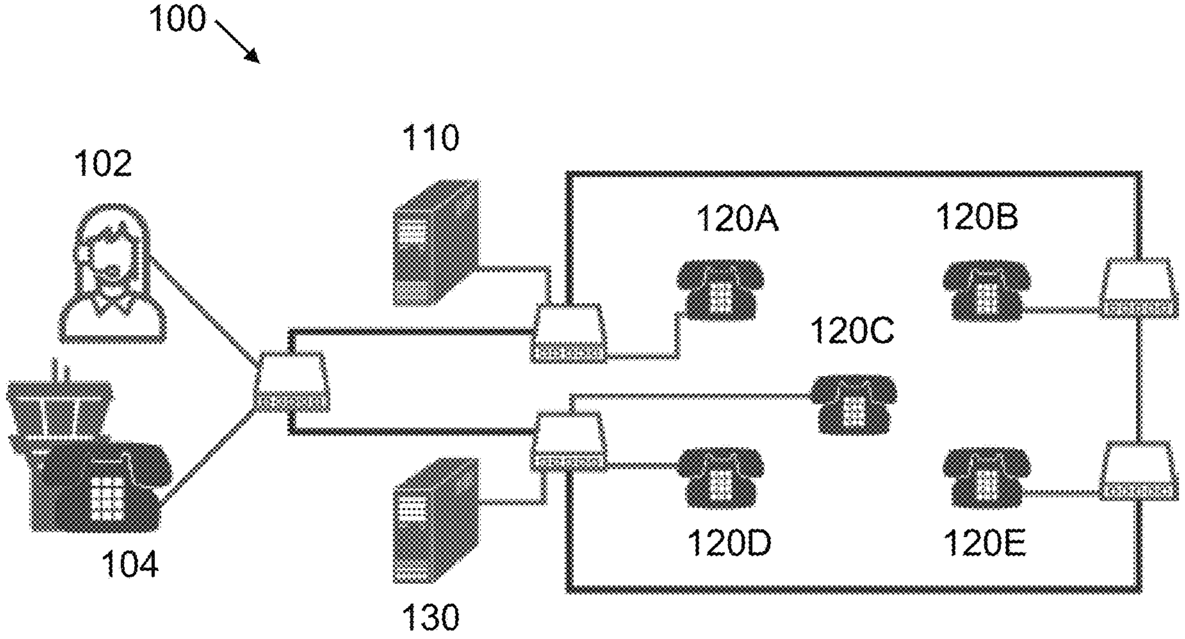
FIG. 1 illustrates an embodiment of a flowchart for a crash phone network.

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

Throughout the following discussion, references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Embodiments of the inventions described herein may include or utilize a special purpose or general-purpose computer that includes one or more servers and/or other computer hardware. The one or more servers can each include, for example, one or more processors and system memory. The computer can also include physical and other computer-readable media for carrying or storing computer-executable instructions and/or data structures. Such instructions can facilitate the systems and methods described and may be stored in a non-transitory computer-readable medium and executable by the one or more servers or other computing devices. As an example, a processor may receive instructions from a non-transitory computer-readable medium and execute those instructions to perform one or more processes.

Computer-readable media can be any available media that can be accessed by a general purpose or special purpose computer system. Examples of computer-readable media include RAM, ROM, EEPROM, solid state drives, Flash memory, and other optical disk storage, magnetic disk storage or other magnetic storage devices, or any other medium which can be used to store desired application code in the form of computer-executable instructions or data structures, and which can be accessed by a general purpose or special purpose computer.

Computer-executable instructions include, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure may also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

The systems and methods described herein may utilize various communication protocols including, for example, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

FIG. 1 illustrates one embodiment of a sample crash phone network 100. Preferred networks may utilize voice over IP (VOIP) protocol but other protocols and communication methods could be used without departing from the scope of the invention herein. The network allows a dispatcher 102 or the control tower 104 to communicate information to one or more devices or sites via a primary call server 110. For example, the primary call server 110 can transmit a call from the dispatcher 102 to various crash phones or other devices 120A-120E, which may be located in a plurality of locations including, for example, fire stations, EMS services, ramp control, police station, operations, and other locations.

Preferably, such devices comprise portable, remote devices that can be located strategically throughout a fire house or other location to promptly notify emergency personnel of an emergency. The system can allow for a variety of customized alerting methods using various devices.

It is further contemplated that one or more of the devices can comprise an acknowledgement switch or button that, when actuated, transmits a signal to dispatch 102 to indicate that the alert was received.

Exemplary devices comprise digital crash phones, televisions, speakers, light indicators, timers indicating an amount of time elapsed since the alert was received.

The devices may also include a touchscreen display, which may be disposed in fire stations or other emergency asset locations. The devices can receive a transmission concerning an emergency sent by the dispatcher such as the Air Traffic Control Tower. Preferably, the devices have an interface with a switch or button that, when actuated, transmits a signal to dispatch 102 to allow the responding emergency personnel to acknowledge receipt of the call or transmission and provide a visual recognition that the transmission was received. The devices can be monitored full time and provide system health checks at set intervals.

The network 100 can further include a secondary call server, which can act concurrently with the primary call server 110 and/or act as a backup in case of failure of the primary call server 110.

The server(s) thereby connect the dispatch to the crash phones and other devices of the fire stations and other emergency assets. The server(s) are preferably configured to monitor the equipment on the network and notify support personnel if problems are detected. The server(s) advantageously allow for communications between the parties and monitoring of receipt and transmission of each message.

The network 100 may also include a master control unit (MCU) which receives all alerts sent from the dispatch 102 and transmits the alerts to the designated crash phones or other devices, thereby station, notifying emergency personnel of the nature of the emergency and the tiered response level required. The MCU can also be configured with a fully automated text-to-speech function that automatically announces emergency units assigned to the emergency, the nature of the emergency, the location of the emergency, and any additional alert information. In addition to receiving information via a phone or speaker, emergency information can also be displayed on the devices or printed out to provide all details necessary for the emergency response.

It is further contemplated that the MCU can change a decibel level of an alert based on a time of day. For example, during the daytime, the decibel level may be increased due to increased noise. In the nighttime, the decibel level can be decreased as emergency locations are generally quieter.

Figure 2:
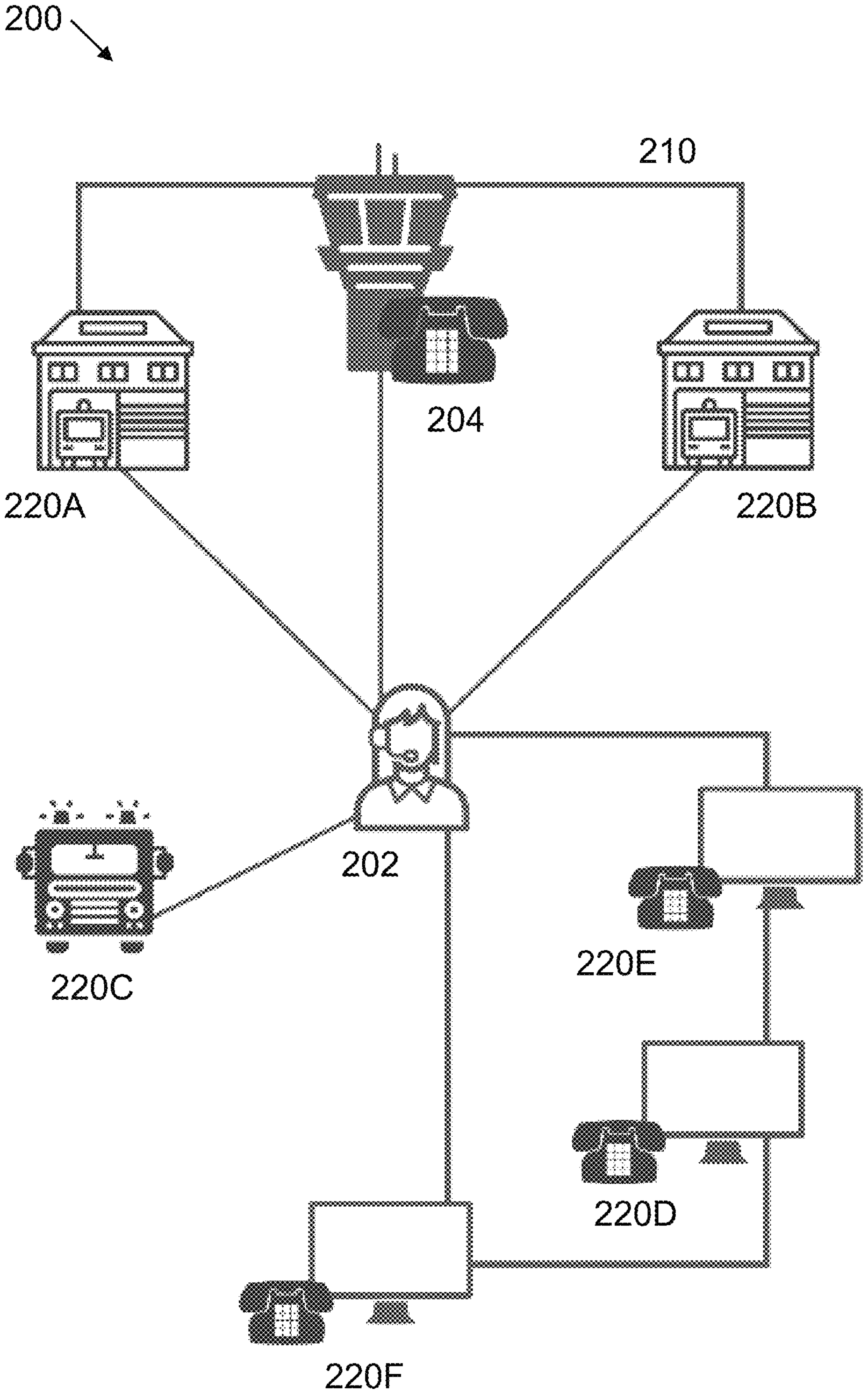
FIG. 2 illustrates an embodiment of an aircraft emergency management system.

FIG. 2 illustrates one embodiment of an airport emergency management system 200. The emergency management system 200 utilizes network connectivity to provide a communication link from the dispatch 202 to the control tower 204 as well as to various entities which may be located on or off the airport, which may include one or more fire stations 220A-220B, fire trucks or other emergency units or personnel 220C, airport operations 220D, police and other airport agencies 220E-220F. A communication network 210 such as described in FIG. 1 may be utilized with the system, for example.

Preferred systems utilize a wired communication network and a voice over IP protocol to digitally communicate with non-mobile entities due to the greater reliability of wired connections. However, a loss of network connectivity from tower 204 to the entities 220A-220C and dispatch 202 could render the system 200 inoperative when it is needed most. Thus, it is contemplated that the system 200 may comprise a secondary network comprising a wireless network that acts as a backup for system 200. In the event of a loss of wired communication from the control tower 204 to the first responders (e.g., 220A-220C) or other parties 220D-200F, the wireless backup network provides communications of audio, video, or other data to first responders (e.g., 220C) located on an airfield, for example. The wireless backup network advantageously does not depend on any network connectivity to send the alert throughout the airfield.

One or more of the entities 204 and 220A-220F may have VoIP crash phones, which are connected to the network 210 and able to receive communications from the dispatch 202, for example.

Figure 3:
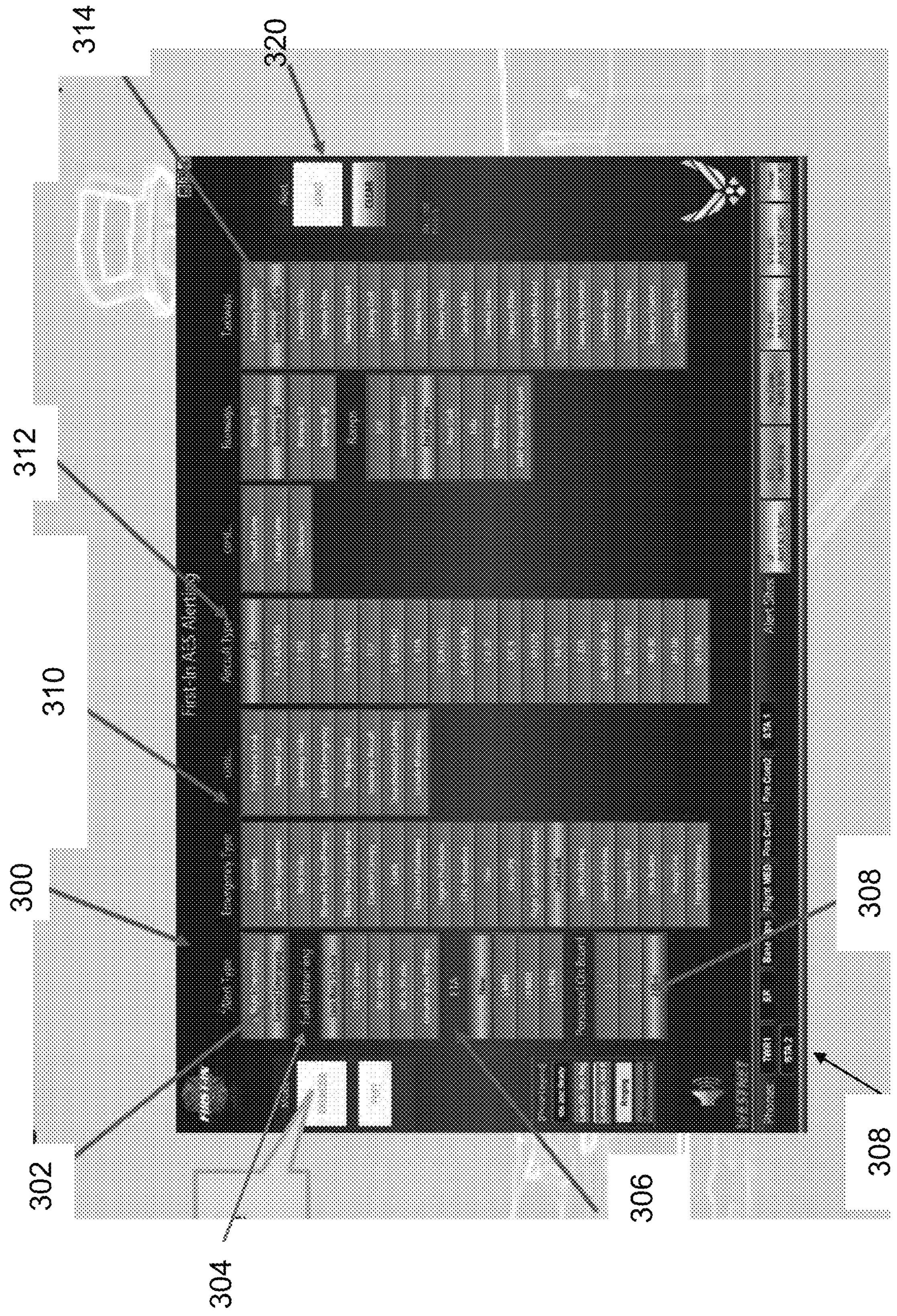
FIG. 3 illustrates an embodiment of a graphical user interface (GUI) that can be used with the systems and methods described herein.

FIG. 3 illustrates one embodiment of a graphical user interface 300 (GUI) that can be used with the systems and methods described above. Preferred interfaces are touch screen driven As shown in FIG. 3, a tower operator or dispatcher can select various criteria for an emergency situation including, for example, an alert type 302 (e.g., inflight emergency or ground emergency), fuel remaining on the aircraft 304 (e.g., less than 15 minutes, 15-30 minutes, 30-60 minutes, 60-90 minutes, or more than 90 minutes), estimated time of arrival (ETA) of the aircraft 306 (e.g., immediate, 5 minutes, 30 minutes, greater than 30 minutes), personnel on board 308 (e.g., one, two, or more than two), an emergency type 310, an aircraft type 312, a runway, ramp, and/or taxiway 314.

Exemplary emergency types 310 can include, for example, an accident, a barrier engagement, a bird strike, a blown tire small or large frame, a cracked canopy, a crash, an electrical problem, an engine problem, an EPU activation, a fire, a fire-EPU, a flight control problem, a fuel leak, a fuel problem, a gear problem, a squawk 7700, hot brakes, a hung gun, a hung ordinance, a hydrazine leak, a jammed gun, a lightning strike, a medical emergency, not specified, smoke in aircraft, an unauthorized landing, and unsafe munitions. It is contemplated that the specific type of emergencies listed can vary depending on the airport (e.g., military or civilian), and can be updated over time as needed.

Exemplary aircraft types 312 can include, for example, A-10, F-15 A/B/C/D, F-15E, F-16 C/D, F-35A/B/C, 737, C-130 E/H/J, C-17A, C-32A (757), C-5 A/B/C/M, CV-22, DC-9, F-18 C/D, F-18 E/F, F-22A, KC-10A (DC-10), KC-135 (707), MD-80, UH-1N, UH-72A, small frame aircraft, large frame aircraft, or unknown. It is contemplated that the specific type of aircraft listed can vary depending on the airport (e.g., military or civilian), and can be updated over time as needed.

In some embodiments, the GUI 300 may be utilized with an AES Alerting Tower Screen, which is the data collection and transmitting equipment that can be located in the Air Traffic Control Tower or other dispatch location. The Tower Screen or interface is used by air traffic controllers or other dispatchers using the GUI 300 to send aircraft emergency details (transmissions) to the Alerting End Points (e.g., crash phones and other devices) located in fire stations or other emergency assets.

The GUI 300 is preprogrammed with the specific airfield response and aircraft details that are preferably visually displayed in a touchscreen configuration. The GUI 300 can also be preprogrammed with the emergency assets to be contacted depending on the emergency, the devices associated with each emergency asset, and the communication protocol(s) to be used to contact each device. Using the GUI 300, the air traffic controller or other dispatcher can immediately notify emergency assets regarding details of the emergency with a very quick movement across the screen, reducing verbal communication difficulties. By inputting information about the emergency using the GUI 300, it is contemplated that the systems and methods described herein can automatically (i) receive information about an emergency from a dispatch unit, (ii) select a subset of a plurality of emergency assets based on the received information (i.e., one or more of the selected criteria), and (iii) automatically transmit an alert to each of the emergency assets of the subset who should be contacted.

For example, once the criteria are inputted and submitted such as by using the send button 320, an alert message or instructions can be automatically created or manually recorded or otherwise inputted. Once created or inputted, the message can be automatically transmitted by the system to crash phones or other devices of each emergency asset. Examples of such devices 322 are shown in the bottom left corner of the GUI 300. The GUI 300 therefore allows for instant visual and verbal notification of an emergency to all response facilities. Using the emergency system having dedicated crash phones, communications from a control tower or other location can be automatically and simultaneously provided to all designated crash phones 322 on the network, which relay critical details of the emergency. Such systems thereby reduce emergency response time and ensure the proper emergency assets are promptly notified about the emergency.

In addition, the systems and methods herein allow a dispatcher or other user to immediately see using the GUI 300 shown in FIG. 3 which crash phones or other devices 322 have been picked up and then transmit the emergency notification/information once all of the designated crash phones or other devices have been picked up/answered. Alternatively, the message can be transmitted to each designated crash phone or other device individually as each device is picked up/answered.

It is contemplated that communications between the dispatcher and emergency assets can be recorded. If a crash phone or other device is not picked up/answered, the system can automatically attempt to reach the emergency asset via a second communication channel for redundant alerting, which may include, for example, a two-way radio, an analog phone, or other communication devices. Using a digital connection between the dispatcher and the crash phones provides for clear audio communication and can eliminate delays that can occur using analog systems.

The systems and methods described herein offer many advantages over prior art system including, for example, reduced response times, lowered stress levels of emergency personnel, ramped, visual alerting, automated dispatch and text-to-speech, redundancy, and networked-based alerting via crash phones, texts, emails, and/or pagers.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for emergency management and response, comprising:

an alert server configured to (i) receive information about an emergency from a dispatch unit, (ii) select a subset of a plurality of emergency assets based on the received information, and (iii) automatically transmit an alert to each of the emergency assets of the subset, wherein the information comprises at least two of an alert type, a fuel remaining on the aircraft, an estimated time of arrival of the aircraft, a number of personnel on board, an emergency type, an aircraft type, a runway, a ramp, and a taxiway;

wherein each of the emergency assets comprises a device configured to receive the alert and generate a notification, wherein the device is further configured to transmit a reply to the alert server when the alert is acknowledged;

wherein each of the emergency assets further comprises a second device; and wherein, if the reply is not received from the device of one of the emergency assets of the subset, the alert server is further configured to automatically transmit the alert to the second device.

2. The system of claim 1, wherein at least one of the emergency assets comprises a crash phone, wherein the crash phone further comprises a switch or button that, when actuated, transmits the reply to the alert server.

3. The system of claim 2, wherein the crash phone is further configured to transmit a reply to the alert server when the crash phone is in use.

4. The system of claim 1, wherein the dispatch unit comprises a display screen configured to present a graphical user interface that allow the information about the emergency to be selected.

5. The system of claim 1, wherein the alert comprises an emergency message.

6. The system of claim 1, further comprising a secondary alert server configured to be used when the primary alert server is disabled.

7. The system of claim 1, wherein the dispatch unit comprises a control tower of an airport.

8. The system of claim 1, wherein the plurality of emergency assets comprises one or more fire stations, EMS services, ramp control, police station, and airport operations.

9. The system of claim 1, wherein the alert server is further configured to select a decibel level of the alert to be transmitted based on a current time of day.

10. The system of claim 1, wherein the alert server is communicatively coupled with the emergency assets via a wired connection.

11. A system for emergency management and response, comprising:

an alert server configured to (i) receive information about an emergency from a dispatch unit, (ii) select a subset of a plurality of emergency assets based on the received information, and (iii) automatically transmit an alert to each of the emergency assets of the subset, wherein the information comprises at least two of an alert type, a fuel remaining on the aircraft, an estimated time of arrival of the aircraft, a number of personnel on board, an emergency type, an aircraft type, a runway, a ramp, and a taxiway;

wherein each of the emergency assets comprises a device configured to receive the alert and generate a notification, wherein the device is further configured to transmit a reply to the alert server when the alert is acknowledged; and wherein the alert server is further configured to automatically transmit the alert to each of the emergency assets of the subset only when a reply has been received from all of the emergency assets that the alert is acknowledged.

12. The system of claim 1, wherein the alert server is further configured to automatically transmit the alert to each of the emergency assets when a reply has been received from that emergency asset that the device has been picked up or answered.

13. The system of claim 1, wherein each of the devices further comprises a visual display configured to display information about the emergency.

14. The system of claim 1, further comprising:

a touch screen display communicatively coupled the alert server;

wherein the alert server is further configured to (i) present information about the emergency on the touch screen display, (ii) receive input of one or more criteria about the emergency via the touch screen display, and (iii) automatically transmit the alert to the subset of emergency assets based on the received criteria; and wherein the alert server is further configured to present on the touch screen display whether each of the emergency assets acknowledged the alert.

15. A system for emergency management and response, comprising:

an alert server communicatively coupled with a touch screen display, wherein the alert server is configured to (i) receive information about an emergency from a dispatch unit, (ii) present information about the emergency on the touch screen display, (iii) receive input of one or more criteria about the emergency via the touch screen display, and (iv) automatically transmit an alert to a set of emergency assets based on the received criteria, wherein the information comprises at least two of an alert type, a fuel remaining on the aircraft, an estimated time of arrival of the aircraft, a number of personnel on board, an emergency type, an aircraft type, a runway, a ramp, and a taxiway;

wherein each of the emergency assets comprises a device configured to receive the alert and generate a notification, wherein the device is further configured to transmit a reply to the alert server when the alert is acknowledged; and wherein the alert server is further configured to present on the touch screen display whether each of the emergency assets acknowledged the alert.

16. The system of claim 15, wherein each of the emergency assets further comprises a second device, and wherein, if the reply is not received from the device of one of the emergency assets of the subset, the alert server is further configured to automatically transmit the alert to the second device.

17. The system of claim 15, wherein the emergency assets comprises one or more fire stations, EMS services, ramp control, police station, and airport operations.

18. The system of claim 15, wherein at least one of the emergency assets comprises a crash phone, wherein the crash phone comprises a switch or button that, when actuated, transmits the reply to the alert server.

* * * * *